July 4, 1944.  W. J. LYONS  2,352,906
SPRING BALANCE
Filed March 18, 1943  2 Sheets-Sheet 1

INVENTOR
W. J. LYONS
BY
ATTORNEYS

July 4, 1944.  W. J. LYONS  2,352,906

SPRING BALANCE

Filed March 18, 1943  2 Sheets-Sheet 2

INVENTOR
W. J. LYONS

ATTORNEYS

Patented July 4, 1944

2,352,906

UNITED STATES PATENT OFFICE 2,352,906

SPRING BALANCE

William James Lyons, New Orleans, La., assignor to Claude R. Wickard, as Secretary of Agriculture of the United States of America, and his successors in office Application March 18, 1943, Serial No. 479,576

8 Claims. (Cl. 265—68)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a spring balance for accurately obtaining weights such as is necessary, for example, in laboratory technique, and has among its objects the provision of a precision instrument which is easily manipulated, and the provision of an instrument which reduces the human factor entering into its use. More particularly, the objects are the provision in a spiral spring balance of a rotatable index pointer control knob at the side of the balance in a convenient location, rendering its manipulation comfortable; and the provision in such a balance of a zero-adjustment control knob positioned on the front of the instrument where it is convenient to manipulate. Other objects will be apparent from the following description and claims.

Embodiments of the invention are illustrated in the accompanying drawings, in which Figure 1 is a three-dimensional view of one embodiment of the balance, certain parts being broken away for clarity of illustration;

Figure 1:
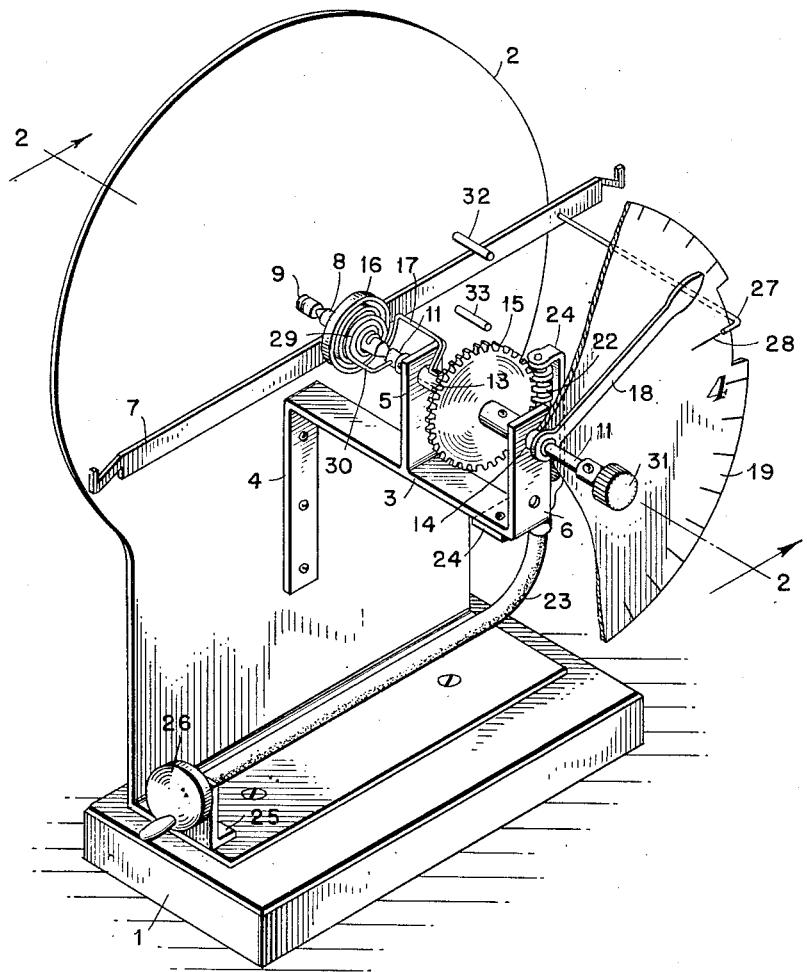
Figure 2:
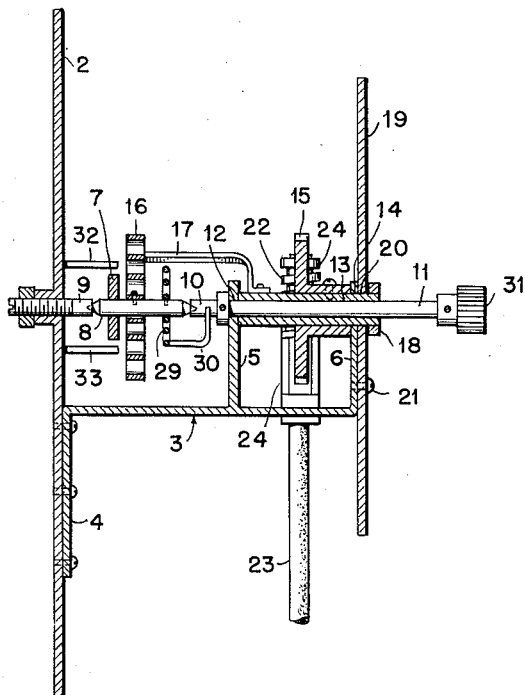
Figure 2 is a fragmentary section on the line 2—2 of Figure 1.

Referring to Figures 1 and 2 of the drawings, the embodiment shown comprises a pedestal 1 and a supporting member 2. The operating mechanism of the balance is supported by a bracket 3 secured to the supporting member 2 by a leg 4 and provided with two upright arms 5 and 6. The mechanism comprises a beam 7 provided with a spindle 8 fixed thereto and pivoted at one end by the pivot bearing 9 carried by member 2. The other end of the spindle is pivoted by a pivot bearing 10 provided on the end of the zero-adjustment shaft 11 coaxial with the spindle. Shaft 11 is rotatably mounted in a bearing aperture 12 provided in arm 5, and has a tubular index pointer shaft 13 rotatably mounted thereon, the pointer shaft being journaled near its one end in a bearing aperture 14 provided in arm 6. A driving means such as a gear 15 is fixedly mounted on the pointer shaft 13.

The article to be weighed is suspended from the right hand end of the beam, and its weight is counterbalanced by the spiral counterbalance spring 16, which has its inner end connected to spindle 8 and its outer end connected by a jumper 17 to index pointer shaft 13, whereby a counter-clockwise rotation of gear 15 winds up the spiral counterbalance spring to offset the torque on the beam due to the weight. Rotation of gear 15 also causes rotation of the index pointer shaft 13 which has an index pointer 18 fixed thereto.

The index pointer traverses a flat dial 19 which is calibrated to read the weight in any desired units. Dial 19 is mounted normal to shaft 11, is provided with a central aperture 20 through which shaft 11 and the pointer shaft 13 project, and is supported by a bolt 21 which secures it to arm 6.

Driving gear 15 is rotated by means of a worm gear 22 fixed to a flexible drive shaft 23 suitably supported at the gear end by a bracket 24 affixing it to bracket 3, and at its other end by a bracket 25 affixing it to the pedestal 1. The hand end of the drive shaft is provided with a suitable index pointer control knob 26, so positioned that it is convenient to the hand of the operator, preferably his left hand, although the hand end of the driving shaft may be not connected to the pedestal and consequently positioned wherever desirable. In such position the operator may, while operating the instrument, rest his hand on the table or bench on which the instrument sits.

In order that an instrument of this type be accurate, it is necessary that the beam 7 remain horizontal, since the dial is calibrated with it in such predetermined position, and a change would result in a decrease in the torque due to the weight. Means is, therefore, provided for making zero-adjustments, that is, adjustments which, with the beam unloaded, place it in the predetermined position when the index pointer 18 reads zero on the dial. The zero-adjusting means comprises a balance pointer 27 affixed to the beam and arranged to traverse a zero-adjustment marking 28 so located on the face of the dial that it indicates the horizontal position of the beam. The zero-adjustment is effected by a light spiral zero-adjusting spring 29 having its inner end connected to the spindle 8, thereby being connected to the beam, and its outer end connected by a jumper 30 to the zero-adjustment shaft 11. The zero-adjustment shaft is provided on its forward end with a zero-adjustment control knob 31, and is freely rotatable in the tubular index pointer shaft 13, but is frictionally held against free rotation in aperture 12 to prevent its being rotated along with the index pointer shaft when a weight is being taken.

Stops 32 and 33 prevent the beam from rotating beyond predetermined limits.

To use the balance, it is first set to zero-adjustment by setting the index pointer 18 on zero and operating the zero-adjusting means by control knob 31 until the balance pointer 27 coincides with marking 28. The arrangement of the parts is such that this adjustment is quickly and easily made. The zero-adjustment control knob 31 being placed in front of the dial, is conveniently accessible, and the operator can easily make the adjustment while watching the dial.

The article to be weighed is then suspended from the beam, which moves the balance pointer off marking 28, and the index pointer control knob 26 is turned to rotate the driving gear 15 and wind up the counterbalance spring 16 until a position is reached at which its torque exactly counterbalances the torque due to the weight. This point is determined when the balance pointer is again brought into coincidence with marking 28. Rotation of gear 15 also rotates the index pointer, and the weight is read on the dial marking opposite the index pointer.

The ease with which the instrument is manipulated is manifest. The zero-adjustment can be made with the right hand, which is then freed to place the object to be weighed in the pan. The operator can then easily adjust the spiral balance spring by turning control knob 26 with his left hand which rests comfortably on the table. All operations may be effected while the operator is in a sitting position, with the dial and both pointers in easy visual range. The ease of operation eliminates to a large extent the human factor in the measurements, thus rendering more accurate the determination of the weights. This feature is very important where accuracy is essential, and especially where a long series of weights is being taken.

Although the above described embodiment is preferred, it is apparent that changes may be made without departing from the principal features of the invention. For example, other forms of connections may be made to impart the movement from the index pointer control knob 26 to the tubular index pointer shaft 13, as illustrated in Figure 3, for example, and other arrangements of other parts may be made and yet maintain the locations of the parts for ease of operation.

Figure 3:
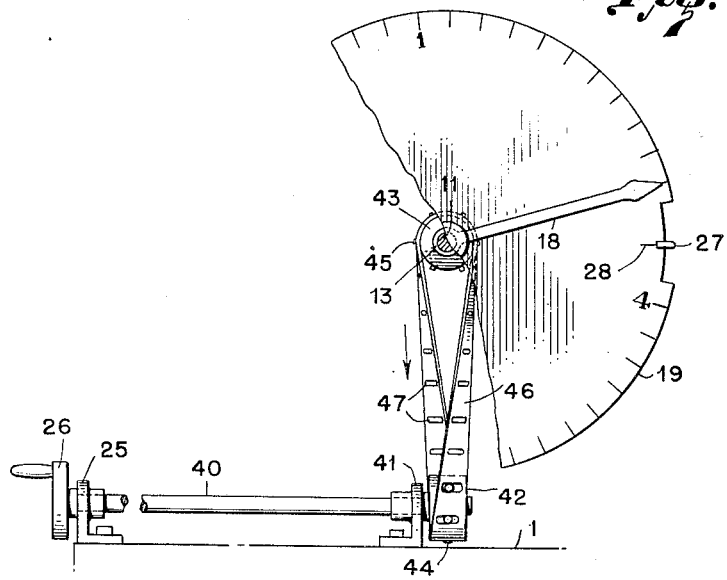
Figure 3 is a fragmentary view of another embodiment.

The embodiment shown in Figure 3 is similar to that shown in Figure 1, except in reference to the connection between the index pointer control knob and the tubular index pointer shaft, and the unmodified parts have been given the same characters. In this figure, the index pointer control knob 26 is connected to the tubular index pointer shaft 13 by a rigid drive shaft 40 rotatably supported in brackets 25 and 41 fixed to the pedestal 1. The free end of the drive shaft is provided with a pulley 42 fixed thereto. The driving means in this instance is a pulley 43. Pulleys 42 and 43 are provided with teats 44 and 45, respectively, and the motion of pulley 42 is transmitted to pulley 43 by a flexible belt 46 having apertures 47 to engage the teats on the pulleys.

Having thus described the invention, what is claimed is:

1. In a spring balance having a beam, a calibrated dial, a counterbalance spring arranged to be adjustably tensioned to counterbalance the weight of an article to be weighed when its weight is added to the beam, and an index pointer fixed to move in reference to the dial with adjustment of the counterbalance spring; means for adjusting the beam to a predetermined position relative to the calibrated dial comprising a zero-adjustment marking on the face of the dial, a balance pointer so fixed to move with the beam that it coincides with the marking when the beam is in said predetermined position, a zero-adjustment shaft projecting through the dial, and a zero-adjustment control knob fixed to the forward end of the shaft in front of the dial; and means for adjusting the tension of the counterbalance spring comprising a driving means fixed to impart movement to one end of the counterbalance spring and to the index pointer, an index pointer control knob positioned at one side of the balance near its bottom whereby an operator can rest his hand on the table on which the balance sits while operating the control knob, and a connection to impart movement from the index pointer control knob to the driving means.

2. A spiral spring balance comprising a beam, a spindle fixed to the beam and having a pivotal bearing supporting its one end, a rotatably mounted zero-adjustment shaft coaxial with the spindle and having a pivotal bearing on its end supporting the other end of the spindle, a spiral zero-adjusting spring having its one end connected to the spindle and its other end connected to the zero-adjustment shaft, a flat dial mounted normal to the zero-adjustment shaft and having an aperture through which the zero-adjustment shaft extends, a driving means rotatably mounted on the zero-adjustment shaft, a spiral counterbalance spring having its one end connected to the spindle and its other end connected to the driving means, and an index pointer fixed to the driving means and arranged to indicate the weights on the dial.

3. A spiral spring balance comprising a beam, a spindle fixed to the beam and having a pivotal bearing supporting its one end, a rotatably mounted zero-adjustment shaft coaxial with the spindle and having a pivotal bearing on its end supporting the other end of the spindle, a spiral zero-adjusting spring having its one end connected to the spindle and its other end connected to the zero-adjustment shaft, a flat dial mounted normal to the zero-adjustment shaft and having an aperture through which the zero-adjustment shaft extends, a driving means rotatably mounted on the zero-adjustment shaft, a spiral counterbalance spring having its one end connected to the spindle and its other end connected to the driving means, an index pointer fixed to the driving means and arranged to indicate the weights on the dial, and an index-pointer control knob located at one side of the balance near the bottom part thereof and having a connection for imparting its movement to the driving means.

4. A spiral spring balance comprising a pedestal, a supporting member fixed to the pedestal, a beam provided with a spindle, said supporting member carrying a bearing for pivotally receiving one end of the spindle, a rotatably mounted zero-adjustment shaft coaxial with the spindle and having a bearing on its end for pivotally receiving the other end of the spindle, a spiral zero-adjusting spring having its inner end connected to the spindle and its outer end connected to the zero-adjustment shaft, a tubular index pointer shaft rotatably mounted on the zero-adjustment shaft, a driving gear fixedly mounted on the index-pointer shaft, a spiral counterbalance spring having its inner end connected to the spindle and its outer end connected to the index-pointer shaft, a flat calibrated dial mounted normal to the zero-adjustment shaft and having an aperture through which the zero-adjustment shaft and index pointer shaft extend, an index pointer secured to the index pointer shaft and arranged to indicate weights on the dial, a zero-adjustment control knob fixed to the front end of the zero-adjustment shaft in front of the dial, a balance pointer fixed to the beam and having its end extending in front of the dial, a zero-adjustment marking on the dial, a worm gear for driving the driving gear, a flexible driving shaft leading to the worm gear, and an index pointer control knob fixed to the free end of the flexible drive shaft.

5. A spiral spring balance comprising a beam, a pivotally mounted spindle fixed to the beam, a driving means mounted to rotate on an axis coaxial with the spindle, a spiral counterbalance spring having its one end connected to the spindle and its other end connected to the driving means, an index pointer fixed to the driving means and arranged to indicate weights on a calibrated dial, and means for manual rotation of the driving means comprising an index pointer control knob connected to the driving means by a flexible drive shaft.

6. A spring balance having a beam, a flat calibrated dial, a counterbalance spring arranged to be adjustably tensioned to counterbalance the weight of an article to be weighed when its weight is added to the beam, an index pointer fixed to move over the front of the dial with adjustment of the counterbalance spring to indicate the weight of the article, and means for adjusting the beam to a predetermined position relative to the dial, said means comprising a zero-adjustment marking fixed in position relative to the dial and in view of the operator when he is in position in front of the dial, a balance pointer fixed to move with the beam and arranged to coincide with the zero-adjustment marking when the beam is in said predetermined position, a zero-adjusting spring having one end connected to the beam, and a zero-adjustment shaft connected to the other end of the zero-adjusting spring for adjusting the beam to its predetermined position, the zero-adjustment shaft projecting through the dial with its end located in front thereof for convenient access to the operator when in the above-mentioned position.

7. In a spring balance having a beam, a calibrated dial, a counterbalance spring arranged to be adjustably tensioned to counterbalance the weight of an article to be weighed when its weight is added to the beam, an index pointer fixed to move in reference to the dial with adjustment of the counterbalance spring, and means for adjusting the tension of the counterbalance spring, said means comprising an index pointer control knob positioned at one side of the balance near its bottom, whereby the operator, when he is in proper position to use the balance, can rest his hand on the table on which the balance sits and handle the control knob, a driving means fixed to impart movement to one end of the counterbalance spring and to the index pointer, and a connection to impart movement from the control knob to the driving means.

8. In a spring balance having a beam, a calibrated dial, a counterbalance spring arranged to be adjustably tensioned to counterbalance the weight of an article to be weighed when its weight is added to the beam, an index pointer fixed to move in reference to the dial with adjustment of the counterbalance spring, and means for adjusting the tension of the counterbalance spring, said means comprising an index pointer control knob positioned at one side of the balance near its bottom, whereby the operator, when he is in proper position to use the balance, can rest his hand on the table on which the balance sits and handle the control knob, a pulley fixed to impart movement to one end of the counterbalance spring and to the index pointer, a rigid drive shaft connected to the index pointer control knob, a pulley connected to the drive shaft, and a flexible belt for transmitting motion from the second-mentioned to the first-mentioned pulley.

WILLIAM JAMES LYONS.